United States Patent [19]
Thompson

[11] Patent Number: 5,524,418
[45] Date of Patent: Jun. 11, 1996

[54] PROCESS FOR MAKING A PACKAGE IN A FORM/FILL SYSTEM

[75] Inventor: Henry B. Thompson, Moore, S.C.

[73] Assignee: W. R. Grace & Co.-Conn., Duncan, S.C.

[21] Appl. No.: 219,569

[22] Filed: Mar. 29, 1994

[51] Int. Cl.⁶ .............................. B65B 9/12; B65B 9/20
[52] U.S. Cl. .................... 53/411; 53/449; 53/451
[58] Field of Search .................. 53/411, 415, 450, 53/451, 449, 468, 469, 172

[56] References Cited

U.S. PATENT DOCUMENTS

| | | | |
|---|---|---|---|
| 1,350,845 | 8/1920 | Scardone | 53/172 X |
| 2,154,521 | 4/1939 | Maxfield | 53/449 |
| 2,257,823 | 10/1941 | Stokes | 53/172 X |
| 2,259,866 | 10/1941 | Stokes | 53/451 X |
| 2,260,064 | 10/1941 | Stokes | 53/415 |
| 2,836,941 | 6/1958 | Hultkrans et al. | 53/411 |
| 2,962,843 | 12/1960 | Hoelzer et al. | 53/449 X |
| 3,340,669 | 9/1967 | Farquaharson | 53/449 X |
| 3,390,507 | 7/1968 | Repko | 53/450 X |
| 3,641,733 | 2/1972 | Lerner | 53/411 |
| 3,650,773 | 3/1972 | Bush et al. | 53/415 X |
| 3,661,322 | 5/1972 | Norman | 53/449 X |
| 4,317,321 | 3/1982 | Torterotot et al. | 53/451 X |
| 4,453,370 | 6/1984 | Titchenal | 53/468 X |
| 4,939,888 | 7/1990 | Katz et al. | 53/411 |

*Primary Examiner*—Horace M. Culver
*Attorney, Agent, or Firm*—Mark B. Quatt

[57] ABSTRACT

A method of making a package includes the steps of folding a thermoplastic film web along its longitudinal axis to make a centerfolded film web having two plies which define a folded longitudinal edge and an open longitudinal edge; forming the centerfolded film into a tube such that the folded longitudinal edge is in transversely overlapping relationship with the open longitudinal edge, preferably such that the folded longitudinal edge is inside the tube, and the open longitudinal edge is outside the tube; longitudinally sealing the tube; closing a first end of the tube; filling the tube with a product; closing a second end of the tube to define a tube segment; and separating the tube segment to make a package. The film web is optionally printed before being folded to make a centerfolded film web.

2 Claims, 5 Drawing Sheets

PROCESS FOR MAKING A PACKAGE IN A FORM/FILL SYSTEM

BACKGROUND OF THE INVENTION

This invention relates generally to a process for making a package in a form/fill system, such as a vertical form/fill/seal (VFFS) system using either transverse seals or clips. The film, and the final package, preferably have a trap print feature.

It is common practice in packaging many goods, including food items, to use what is generally known as form-fill-seal equipment. In the vertical form-fill-seal arrangement, flexible packaging material is fed from a rollstock to a tube former where a tube is fashioned from the sheet material into a vertically dependent, upwardly open tube having overlapping longitudinal edges. These overlapping edges are subsequently sealed together longitudinally by means well known in the art, and the lower end of the tube is closed by a transverse heat seal, or by a metal clip. At this point the tube is filled with a quantity of the product to be packaged. This product can be e.g. a meat emulsion. A second transverse heat sealing or clipping operation, typically performed after the filled tube has been downwardly advanced, completes enclosure of the product. Simultaneously with or shortly after the second transverse heat sealing or clipping step the tube is completely transversely severed by known cutting means. Thereafter the tube is downwardly advanced and the cycle is successively repeated so as to form a multiplicity of individually packaged products.

Horizontal form-fill-seal equipment is also commonly used in many packaging applications.

Manufacturers of form-fill-seal equipment include Hayssen, Omori, Ilapak, and Kartridge Pak. The latter is used to make a clipped pouch.

Flexible packaging material useful for this as well as other applications typically must meet stringent requirements imposed by the particular food or other article to be packaged. These requirements often include limited oxygen transmission, dimensional stability, and abuse resistance.

Yet another requirement of packaging material, especially in form-fill-seal systems, is good heat sealability with respect to the longitudinal and transverse (if present) heat seals, which are sometimes subjected to loading forces from the introduced product such as food product, soon after the heat seal is formed.

In preparing a chub package of sausage or other processed meats or foods, it is often desirable to make a package that is printed to indicate brand names, product identification, and other information. These packages are sometimes filled at elevated product temperatures, and sometimes undergo a cooking step after packaging. These and other requirements for chub and other packages have traditionally been met by the use of certain conventional trap printed laminate materials. However, these materials tend to be expensive to produce, and it would be desirable to create a process where films such as coextruded films can be printed and then processed in a VFFS arrangement to produce a food package, such as a chub package, meeting the requirements of the customer and the marketplace.

The process described herein is useful in producing food packages, and especially packages having a print feature in the packaging material.

SUMMARY OF THE INVENTION

In one aspect of the invention, a method of making a package comprises the steps of folding a thermoplastic film web along its longitudinal axis to make a centerfolded film web having two plies which define a folded longitudinal edge and an open longitudinal edge; forming the centerfolded film web into a tube such that the folded longitudinal edge is in transversely overlapping relationship with the open longitudinal edge; longitudinally sealing the tube; closing a first end of the tube; filling the tube with a product; closing a second end of the tube to define a tube segment; and separating the tube segment to make a package.

In another aspect of the invention, a preliminary step of printing a film web precedes the centerfolding step.

BRIEF DESCRIPTIONS OF THE DRAWINGS

Details of the present invention are provided by reference to the drawing figures wherein.

DESCRIPTION OF THE PREFERRED EMBODIMENTS

Figure 1:
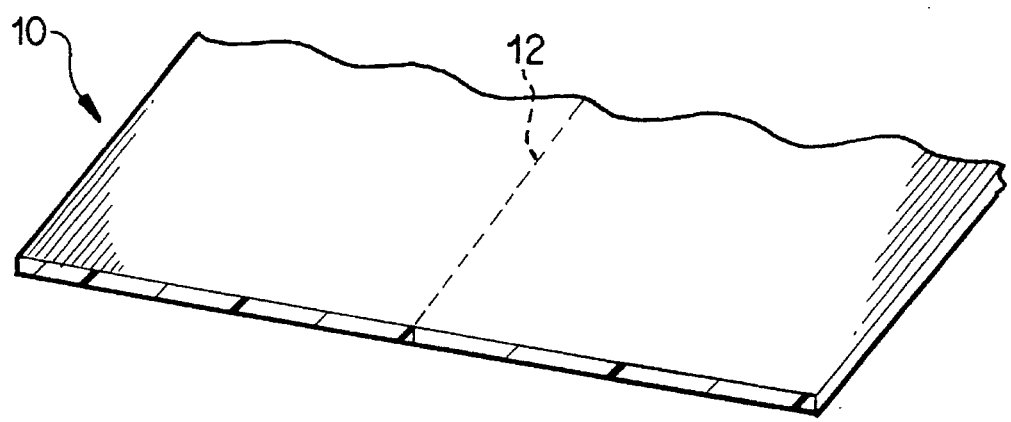
FIGS. 1 to 5 show sections of a film web in a lay flat condition, with various print options, before the centerfolding step.

Referring to FIG. 1, a lay-flat film web 10 is provided by any film manufacturing means, of which many are known in the relevant art. For example, film web 10 can be provided by slitting a collapsed, tubular film to form two discrete webs. Alternatively, film web 10 can be made by a flat or slot die system and extruded as an already flat web. Film web 10 is shown as a monolayer film for ease of illustration, but can in fact, as discussed herein, be of multilayer construction. The film web 10 is shown as a short section of what typically would be a long film web, e.g. as unrolled from a roll of film, or as made when extruded, or after slitting or edge trimming of a tubular film. A longitudinal axis 12 is shown, which simply designates a longitudinal center line of the film web along which the web is folded in accordance with the invention, and as described further herein. It will be understood that folding the film can be accomplished along longitudinal axes other than the exact center line of a given film, and the term "centerfolded" includes these variations. Film web 10 is preferably obtained from a tubular extrusion process, such as tubular cast or hot blown extrusion well known in the art. In either case, the resulting tubular film is collapsed, and slit or edge trimmed by conventional means. The result is two plies of film. These plies can be separated, with either or both plies independently functioning as film web 10. Alternatively, the two plies can be kept together after slitting and act as a unitary film web 10.

Figure 2:
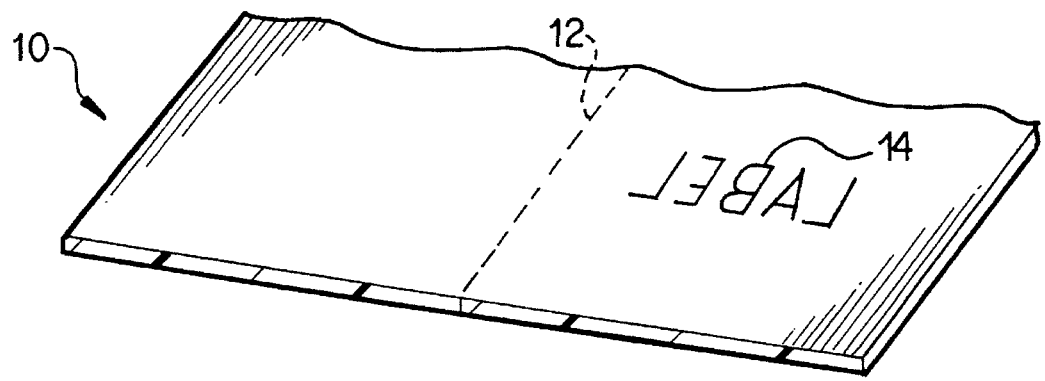
Figure 3:
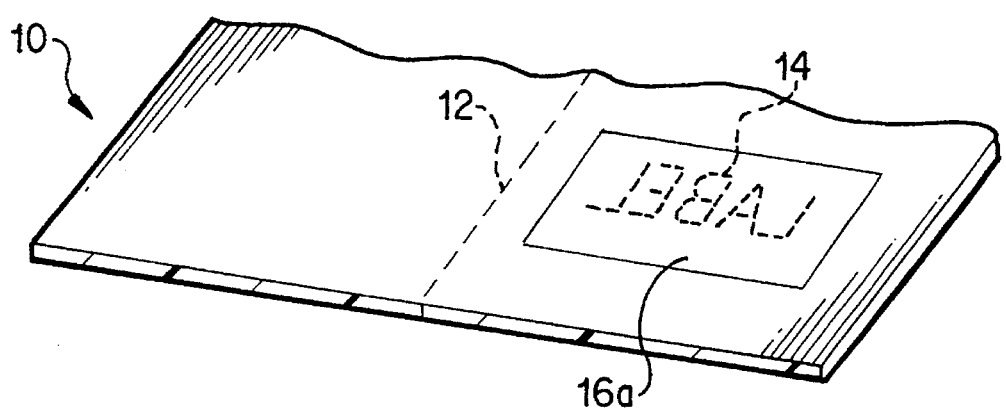
Figure 4:
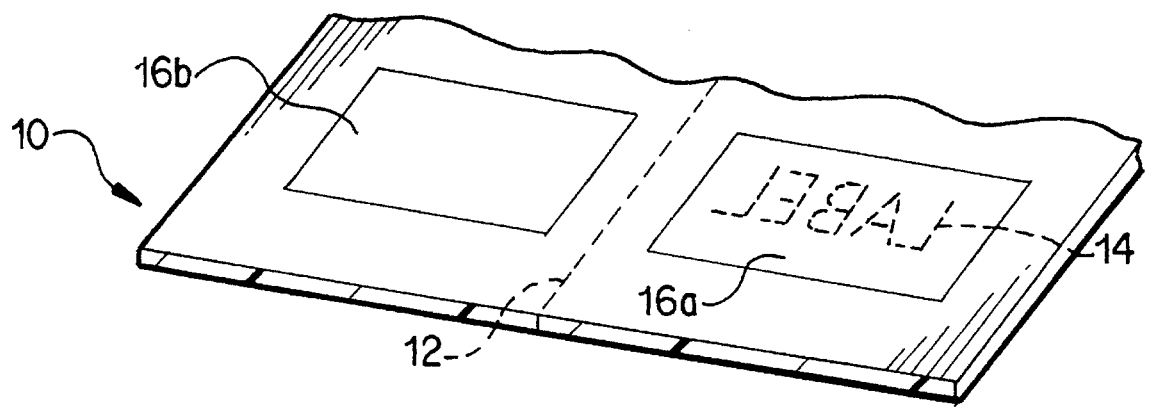
Figure 5:
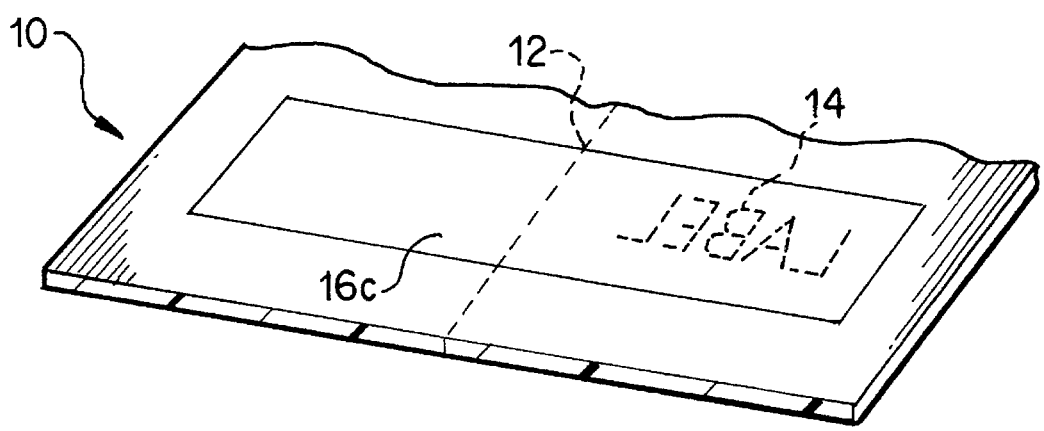

FIG. 2 shows the film web 10 with an optional printed label 14. The label can be alphabetic, numeric, or both, or a design or other indicia. FIG. 3 further shows a background printed label 16a which highlights the primary printed label 14, which is shown in phantom to indicate that label 14 is covered by background label 16a. Label 16a is typically white, and can extend over a limited part of the film web 10 on one transverse half of the web (FIG. 3) or both halves (FIG. 4, labels 16a and 16b). Alternatively, the background label can extend toward the longitudinal axis 12 of the film web 10 (16c in FIG. 5). In practice, the printed label 14 will typically be printed onto the film web 10, and then the background label 16a, 16b, or 16c will be printed over (16a), adjacent (16b), or over and adjacent (16c) the primary printed label 14. These printing options will alter the appearance of a final package made by the inventive process, e.g. by decreasing the "window" of clear film in the package. Various film-grade inks well known in the art can be used to print the film.

Figure 6:
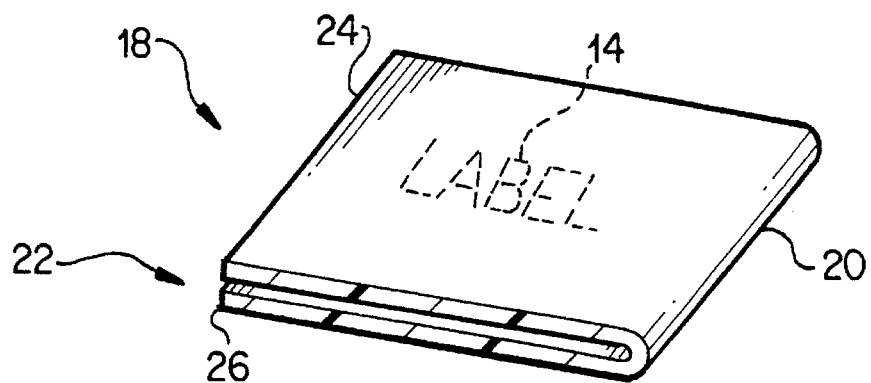
FIG. 6 to 8 show sections of the film web after centerfolding, along with the print options.
Figure 7:
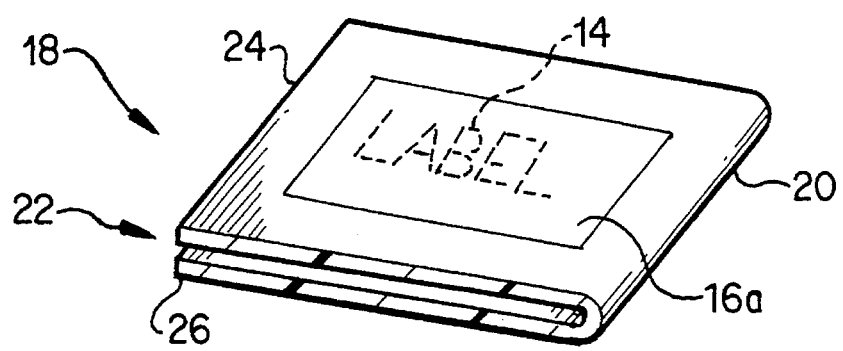
Figure 8:
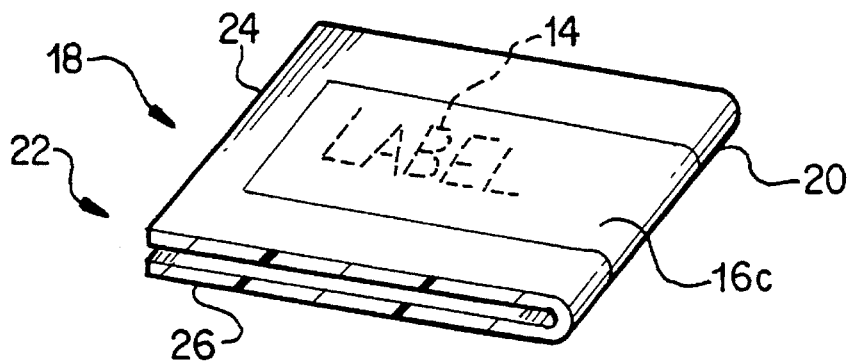

The lay-flat film web 10 is folded along its longitudinal axis, by means well known in the art, to make a centerfolded film web 18. Web 18 has a folded edge 20 and an open edge 22 formed by the two plies 24 and 26 that result from the centerfolding process. FIGS. 6 through 8 show the centerfolded film web with a trapped print feature. FIG. 6 is the centerfolded film web that results from folding the film web of FIG. 2; FIG. 7 corresponds to FIGS. 3 and 4; FIG. 8 corresponds to FIG. 5. Various films can be used in connection with the present inventive process. A particularly suitable film is described in U.S. Pat. No. 4,724,185, incorporated herein by reference. Such films can be monolayer or multilayer in construction, of polyolefinic or any other suitable polymeric resins or blends thereof, and can be produced by coextrusion, extrusion coating, extrusion lamination, conventional lamination, casting, or hot blowing, or other processes. Although tubular extrusion is preferred, films can also be made by slot die extrusion or conventional lamination techniques and brought together to form a multilayer film or laminate. Any suitable number of layers can be used. They can include oxygen barrier polymers. Films used in this invention can optionally be monoaxially or biaxially oriented. Films used in connection with the present invention can optionally be cross-linked by electronic or chemical means.

Figure 9:
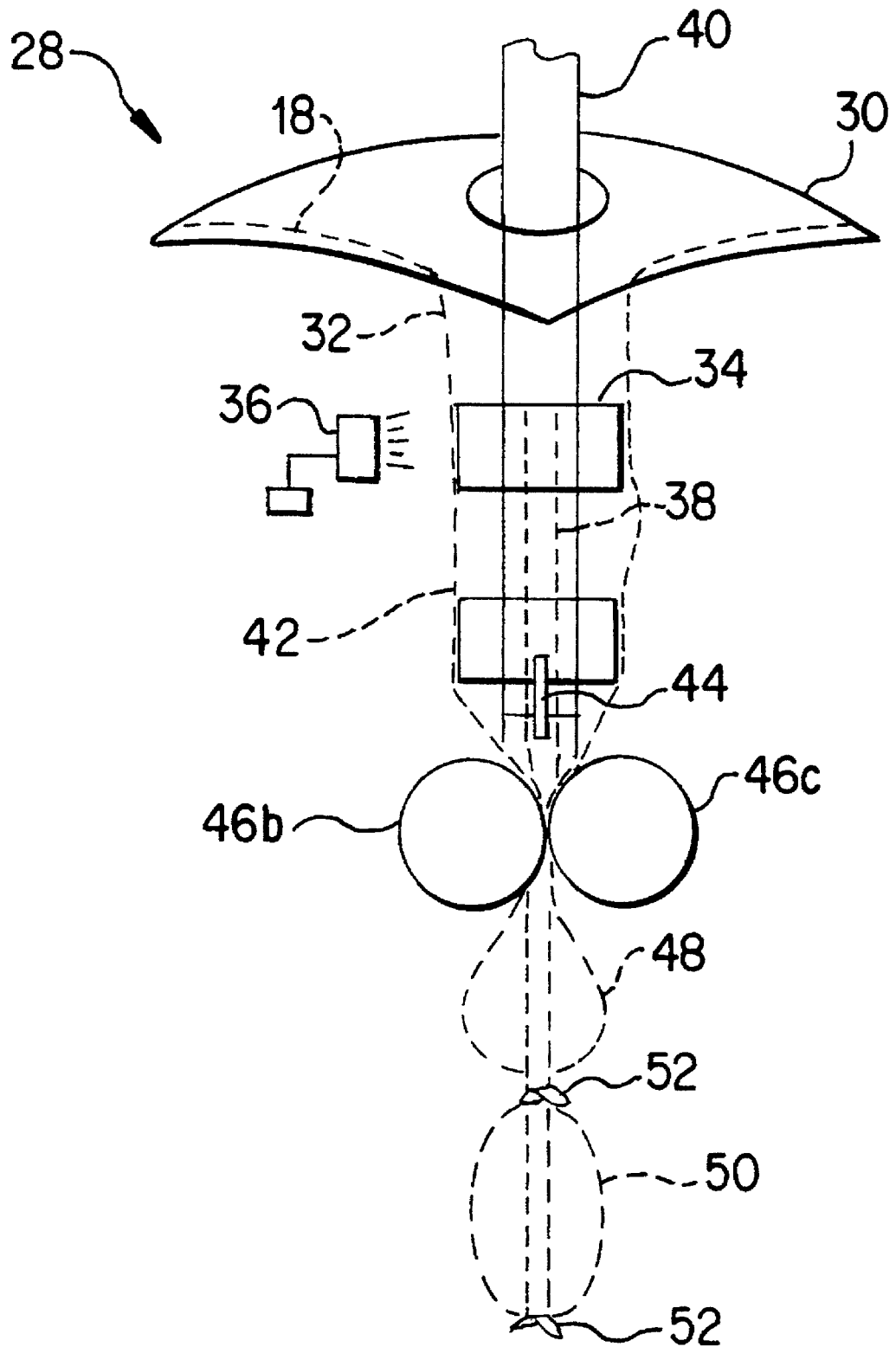
FIG. 9 is a schematic of a form/fill/seal system for use with the present inventive process.
Figure 10:
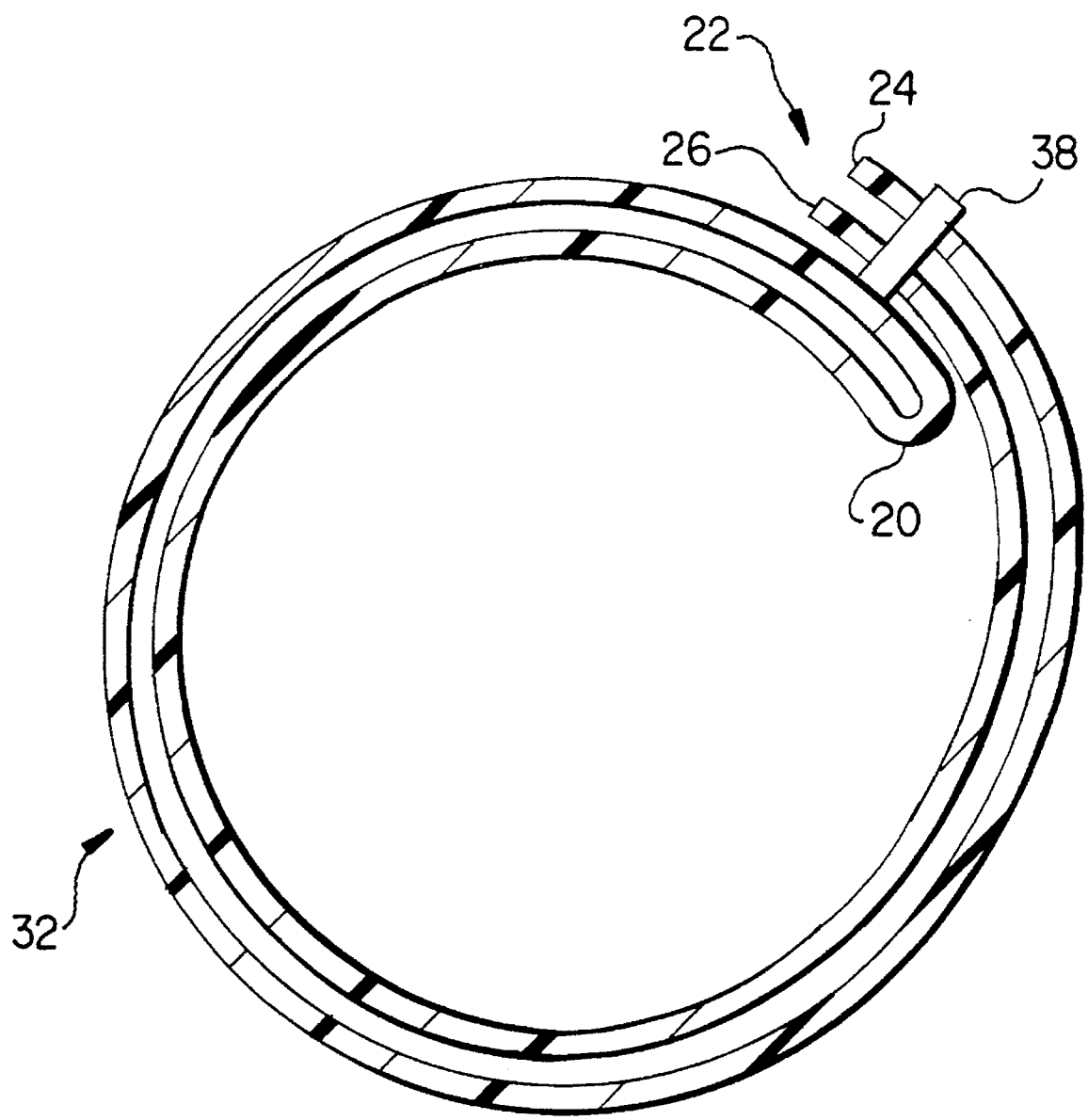
FIG. 10 is a schematic cross section of a centerfolded film in the form of a tube with a longitudinal seal.

FIG. 9 is a schematic of general features of a typical vertical form-fill-seal system 28 for use with the present invention. The centerfolded film web 18 is drawn from a feed roll (not shown) to a forming collar 30. For clarity, the film is shown in dotted lines. The collar converts the centerfolded film web 18 into a tube 32 (see also FIG. 10). The tube is drawn down across a sealing/sizing ring 34, where a sealing means 36 such as a hot air sealer creates a continuous longitudinal lap seal 38 (FIG. 10). The tube travels downwardly outside a central filling mandrel 40, across a film spreader ring 42 having spreader fingers 44. The tube is drawn down by means of two pairs of drive wheels, one pair shown as 46a and 46b. The other pair (not shown) is behind the first pair, on the opposite side of the tube from the first pair. The pairs of drive wheels catch and draw the edge of the tube. The tube is clipped at its lower end by clipping means (not shown) filled with a meat emulsion or other product (see 48) from the filling mandrel 40, and clipped again, this time above the product, to define a tube segment 50. The tube segment is separated from the trailing tube, by well known means, to produce a package with a clip 52 at both ends of the package. Squeeze rolls (not shown) are conventionally used to pinch the filled tube prior to clipping. The aboved described form/fill system is a conventional one well known in the art, and the skilled artisan will be familiar with the details of this as well as other form/fill systems in commercial use.

FIG. 10 shows a cross section of a centerfolded film web after it has been formed into a tube and longitudinally sealed. The folded edge 20 is "inside" the tube in the sense of being disposed radially inside of open edge 22. The open edge 22 is "outside" the tube in the sense of being radially outside the folded edge 20. Having the folded edge on the inside of the package is intended to keep cooking oil and grease (in cook-in applications) from migrating from the contained product between the plies of the film web, and potentially delaminating the web. This is of real concern in commercial cook-in packaging operations. At the same time, longitudinally sealing the two plies 24 and 26 of the open edge 22 of the centerfolded film web 18 prevents cooking water from penetrating into the package.

For end-use applications not involving a cook-in procedure, the relative positions of folded edge 20 and open edge 22 can be reversed from the arrangement just described if desired.

The two plies 24 and 26 are shown slightly separated from each other for the sake of clarity. In practice, these two plies will typically be substantially in contact with each other during the tube forming step.

Various changes and modifications to the invention can be made by one skilled in the art without departing from the scope of the claims as presented below.

I claim:

1. A method of making a food package comprising:
   a) printing a thermoplastic film web;
   b) after printing the web, folding the thermoplastic film web along a longitudinal axis to make a center folded film web having two plies which define
      i) a folded longitudinal edge, and
      ii) an open longitudinal edge,
      iii) the printing trapped between the two plies of the center folded film web;
   c) forming the center folded film web into a tube such that the folded longitudinal edge is in transversely overlapping relationship with the open longitudinal edge, and such that the folded longitudinal edge is inside the tube, and the open longitudinal edge is outside the tube;
   d) longitudinally sealing the tube:
   e) closing a first end of the tube;
   f) filling the tube with a product;
   g) closing a second end of the tube to define a tube segment; and
   h) separating the tube segment to make the package.

2. The process of claim 1 wherein the centerfolded film web is formed into a tube by passing the centerfolded film web over a folding collar of a vertical form/fill/seal machine.

* * * * *